United States Patent
Kotlow et al.

(10) Patent No.: US 6,747,371 B2
(45) Date of Patent: Jun. 8, 2004

(54) METHOD OF REGULATING POWER CONSUMPTION BY ELECTRONIC EQUIPMENT CONTAINING INTEGRAL RECHARGEABLE BACKUP BATTERIES AND USED IN SYSTEMS WHERE THE EQUIPMENT OPERATES FROM A VEHICLE ENGINE BATTERY AND THE LIKE, AND IMPROVED APPARATUS THEREFOR

(75) Inventors: Daniel B. Kotlow, Cherry Hill, NJ (US); John J. Mahon, Framingham, MA (US); Carlos A. Barberis, Haverhill, MA (US)

(73) Assignee: Micrologic, Inc., Westborough, MA (US)

( * ) Notice: Subject to any disclaimer, the term of this patent is extended or adjusted under 35 U.S.C. 154(b) by 65 days.

(21) Appl. No.: 10/131,276

(22) Filed: Apr. 17, 2002

(65) Prior Publication Data

US 2003/0197484 A1 Oct. 23, 2003

(51) Int. Cl.⁷ ............................ H02J 7/00; B60O 1/00
(52) U.S. Cl. ........................ 307/66; 320/104; 34/455
(58) Field of Search ................. 320/104, 103, 320/132; 340/455, 426, 636, 989, 988, 926; 307/66, 64

(56) References Cited

U.S. PATENT DOCUMENTS

| 5,387,858 A | | 2/1995 | Bender et al. |
| 5,563,576 A | * | 10/1996 | Drori et al. ................. 340/455 |
| 5,917,433 A | * | 6/1999 | Keillor et al. .............. 340/989 |

OTHER PUBLICATIONS

U.S. patent application Ser. No. 09/016,604, Kotlow et al.

Orbcomm USA.

Orbital Science Corporation.

* cited by examiner

*Primary Examiner*—Rajnikant B Patel
(74) *Attorney, Agent, or Firm*—Rines and Rines

(57) ABSTRACT

A method of and apparatus for regulating power consumption by electronic equipment containing integral rechargeable backup batteries used, among other places, in systems operating with vehicle engine main batteries and the like, and wherein techniques are employed to minimize the depletion of the main batteries used to maintain the charge on the backup battery, particularly under circumstances of engine shut down, but with electronic equipment continued power demands on the backup batteries.

18 Claims, 3 Drawing Sheets

Figure 1:
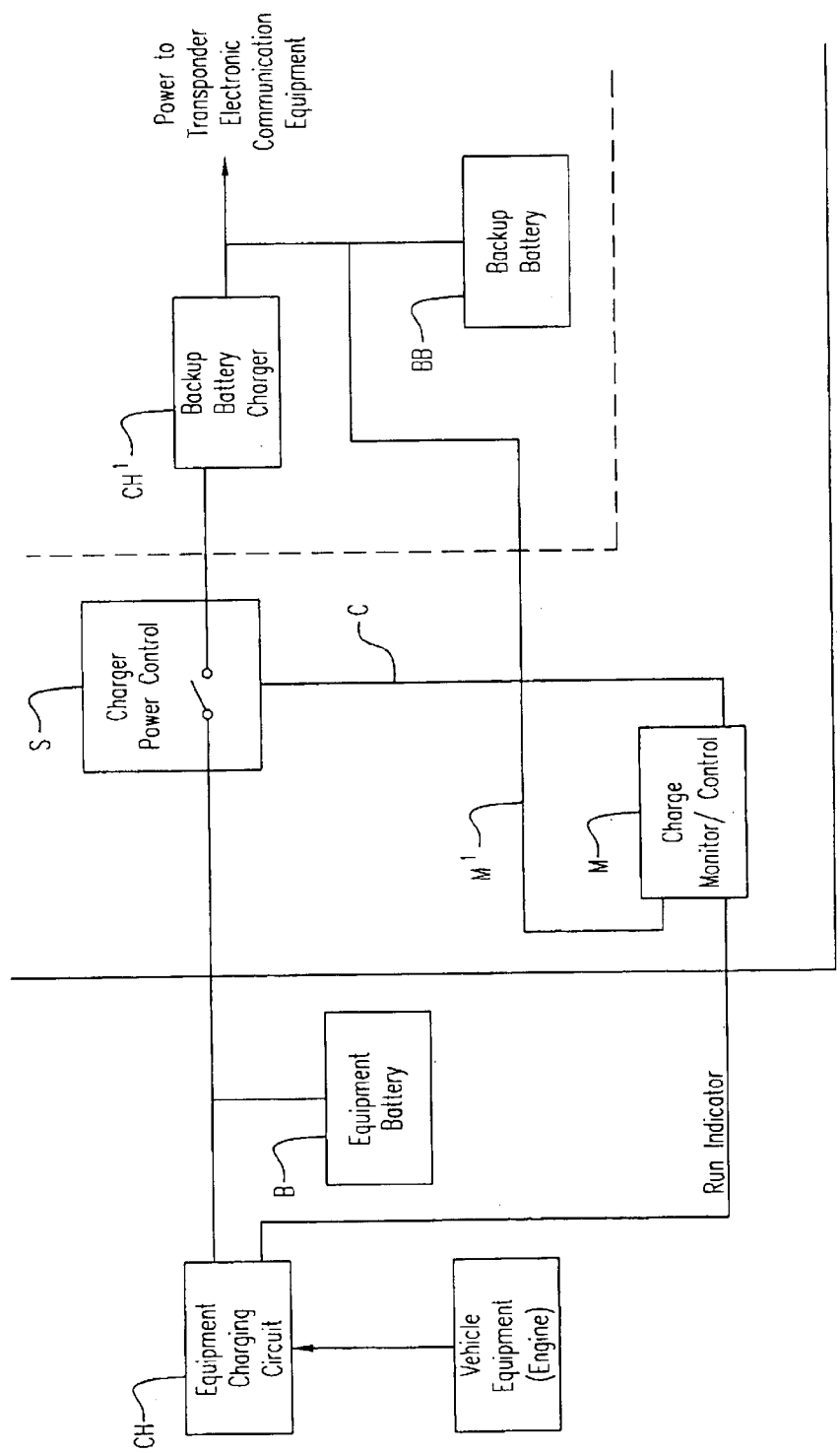

METHOD OF REGULATING POWER CONSUMPTION BY ELECTRONIC EQUIPMENT CONTAINING INTEGRAL RECHARGEABLE BACKUP BATTERIES AND USED IN SYSTEMS WHERE THE EQUIPMENT OPERATES FROM A VEHICLE ENGINE BATTERY AND THE LIKE, AND IMPROVED APPARATUS THEREFOR

FIELD

This invention relates to the use in electronic equipment and the like of rechargeable backup batteries for enabling continued operation of the equipment during power failure of the main equipment battery or source normally designed to power the equipment; being more particularly concerned with minimizing unnecessary depletion of such a main equipment battery to maintain the charge of the backup battery.

More specifically, the invention addresses the particular problems and potential resources arising wherein, for example, radio communication electronic transponders/transceivers are operated from a vehicle engine battery, as in remotely scattered construction vehicles and the like, to communicate to a remote central monitoring station, GPS location information received at the vehicle, and also locally sensed operating conditions of the vehicle, via communication links, including via the Internet web page or otherwise, to such a remote central station.

BACKGROUND

In co-pending application Ser. No. 09/016,604, filed Oct. 12, 1999, an improved monitoring system of this nature is described, also referencing other such systems, wherein a construction equipment fleet manager is supplied at the central station with information and selective displays containing all the basic information, suitably processed, needed remotely to track, monitor and maintain the operation of the fleet and to improve efficiency of utilization of the equipment.

The transponder/transceiver electronic radio communications links described in said copending application, including those offered by Orbcomm USA—Orbital Science Corp., and others, are provided with backup batteries, generally chargeable from the vehicle equipment main batteries, which, in turn, are chargeable from the vehicular engine alternators when the engines are running.

While the art is replete with backup battery and charging circuit configurations for other uses, such as, for example, as disclosed in U.S. Pat. No. 5,387,858, the techniques therein used are not, however, specifically adapted for the particular vehicular engine monitoring requirements of the present invention.

As earlier indicated, the invention is concerned with effecting this backup battery charging in an efficient manner without unnecessarily depleting energy from the vehicle equipment main battery, as by consuming current when the backup battery is already fully charged.

As a power source, the vehicle equipment main battery has the following operating characteristics. While the equipment is operating, the supply of power is plentiful and the main vehicle battery may be recharged by the mechanical operation of the engine, as via the alternator. During periods of time when the vehicle engine is not operating, however, the inefficiency of the electronic equipment backup battery may be a significant factor in running down the vehicle equipment main battery in an unacceptably short time. When, furthermore, the vehicle equipment battery is disconnected, as for servicing or transport of the equipment, it is essential that the electronic equipment backup battery be maintained sufficiently fully charged to support continued operation for a sufficient period of time, for purposes such as communicating knowledge of such disconnection to the central station or periodically reporting its position to the central station in case of unauthorized transport.

The invention specifically addresses these particular circumstances by monitoring whether the equipment is running, and if so, exploiting the plentifulness of power to supply power to the electronic equipment and to charge its backup battery as much as possible.

If, however, the vehicle engine is not running, the invention then enables detecting or estimating by one of various means, the charge state of the backup battery; and when the backup battery is nearly fully charged, controlling power to the electronic equipment, allowing it to run off its backup battery for a period of time consistent with efficient recharging but not so long that the backup battery becomes too depleted to meet its intended requirements. Power is then restored to the electronic equipment for a period of time, allowing it to charge its backup battery to the point at which it is again nearly fully charged.

Various means for effecting the detection or estimation of the charge state of the electronic equipment backup battery may be employed, the selected means preferably adapted to providing, the lower-cost solution for a given amount of savings available by mitigating the inefficiency of the electronic equipment, a given vehicle equipment battery capacity, a given backup battery capacity, and a given operational or fail survival time requirement on the electronic equipment.

Specifically, in accordance with the technique of the invention, the monitoring of the electronic equipment backup battery open circuit voltage and charging current, in consort with consideration of the total current or charge drawn from the backup battery since its last charge, can enable such efficient use of the main vehicle battery and the electronic equipment backup battery. This result, moreover, can be attained irrespective of whether the equipment engine that charges the vehicle main battery, is or is not running, and the backup battery voltage is or is not under load. The consideration of these parameters, indeed, enables measuring the state of the electronic equipment backup battery charge when the vehicle engine is not operating; and when it is noted that there has been a predetermined discharge from complete charge, turning the charger circuit on in order rapidly to top off or bring the backup battery up to full charge, and thereupon turning the battery charger off. This enables efficient charging that minimizes energy wasting.

OBJECTS OF INVENTION

The primary object of the present invention, accordingly, is to provide a new and improved method of and apparatus for regulating power consumption by vehicle-carried electronic equipment such as radio transponder/transceiver communication equipment or the like containing integral re-chargeable backup batteries, wherein the electronic equipment operates from vehicle engine-charged batteries and the like, requiring backup battery power and re-charging when the engine shuts off, and, with the invention being particularly suited for use in remote equipment monitoring systems, though being of more general utility, as well.

Other and further objects will be pointed out hereinafter.

SUMMARY

In summary, however, from one of its important aspects, the invention embraces, in a vehicular engine equipment system provided with an engine-chargeable main battery and provided also with engine operational information (and, if desired, positional information) communicating electronic radio transponder/transceiver communication equipment having backup batteries, a method of enabling the efficient charging of such backup batteries from the main battery while regulating the power consumption by the communication equipment, that comprises, charging the main battery from and at the engine during the operating of the engine; fully charging the back-up battery from the main battery and thereupon terminating such charging; monitoring the charge state of the backup battery during periods of non-operating of the engine and of demands upon the backup battery by the communication equipment; and, upon the monitored reaching of a predetermined level of discharge of the backup battery, further charging of the same from the main battery back to full charge and thereupon terminating such further charging; and repeating said monitoring and further charging and terminating as needed during the continued non-operating of the engine and the continued operational power demands of the communication equipment.

Preferred and best mode implementations and designs are later detailed.

DRAWINGS

Figure 2:
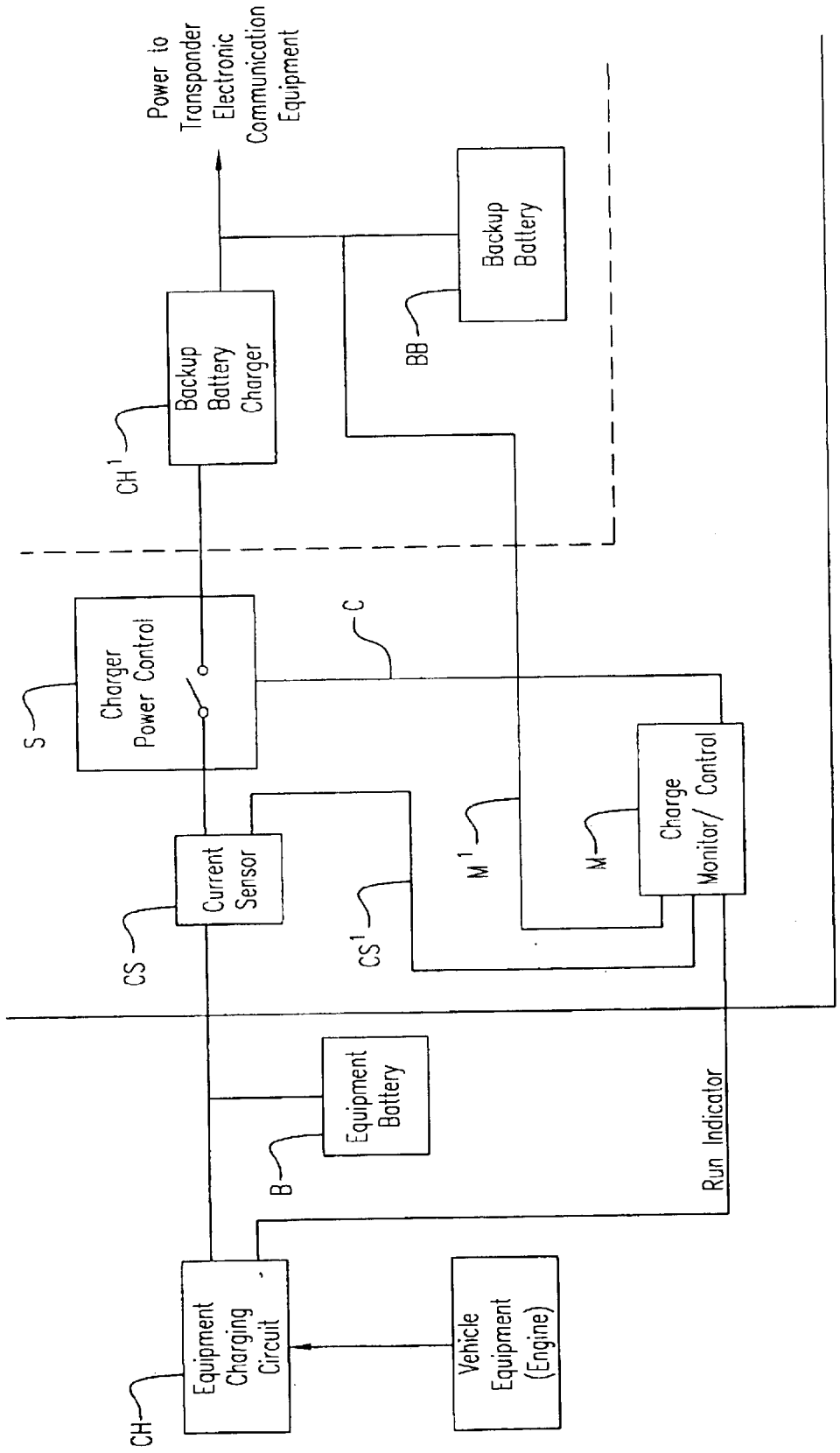
Figure 3:
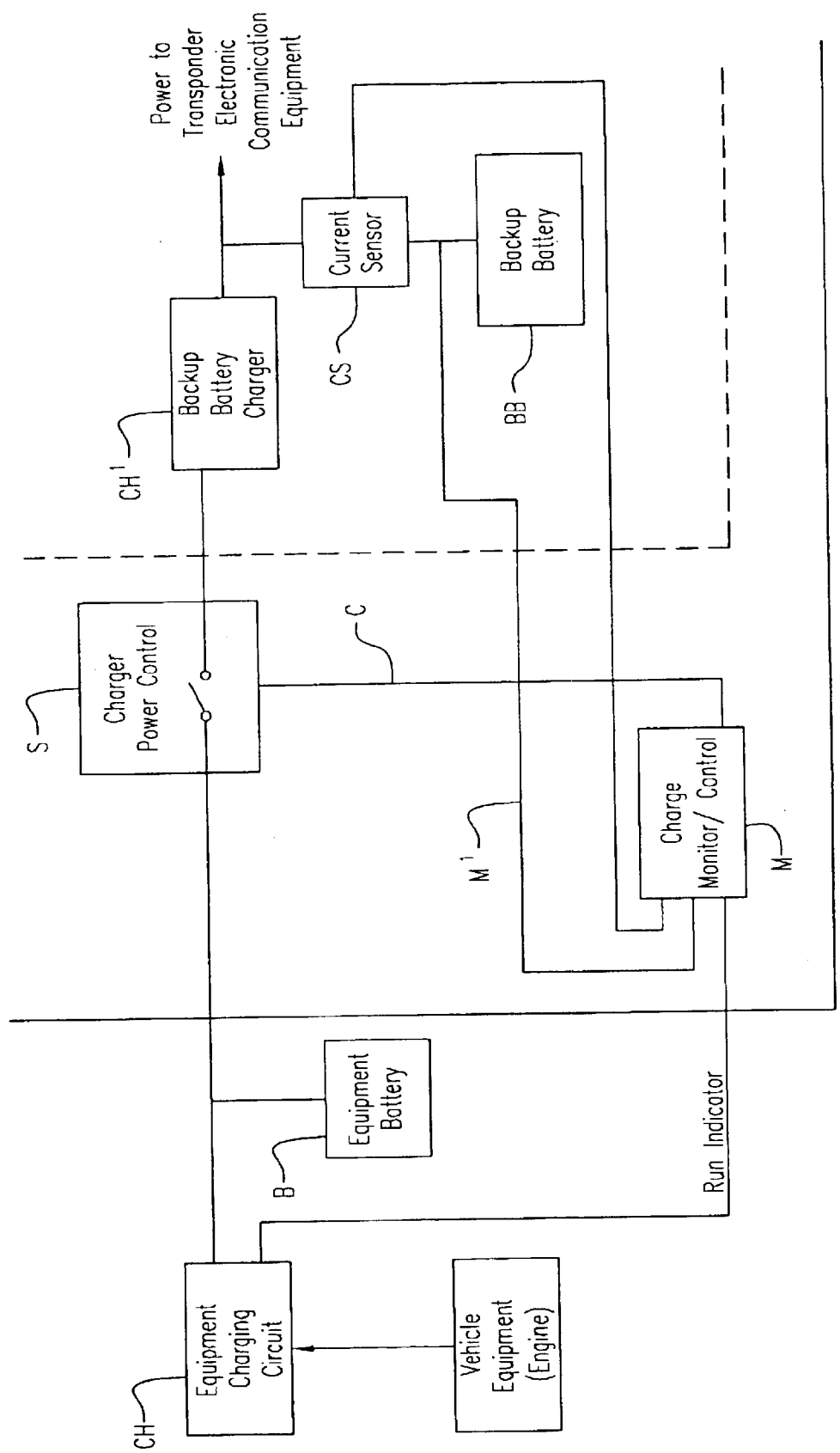

The invention will now be described with reference to the accompanying drawings, FIG. 1 of which is a block schematic diagram of a system constructed in accordance with a preferred embodiment of the invention, employing the method of the invention for minimizing the unnecessary depletion of the equipment main battery in maintaining the charge on the communication equipment backup battery, while ensuring that the backup battery is not discharged below a desired minimum capacity before being recharged to full or near-full charge; and FIGS. 2 and 3 are similar views of modifications that provide increasingly better results, through requiring additional circuits, as later explained.

PREFERRED EMBODIMENT(S) OF INVENTION

Referring to FIG. 1, the vehicle equipment main battery is shown on the left side at B, and an exemplary transponder electronic communication equipment backup battery BB is shown to the right. As before described, when the vehicular engine (so-labeled) is running, its alternator will maintain the charge of the main battery as by the vehicular equipment charging circuit CH. In this embodiment, the communication equipment backup battery BB is also shown provided with its charging circuit $CH^1$ which is energizable from the main battery charger CH upon the actuation of the charger power control switch S. This preferably takes place at all times when the engine is running (switch S in closed position). The state of charge of the backup battery BB is monitored at the monitor M via line $M^1$, as is the running condition of the engine by the running indicator line so-labeled.

The system of FIG. 1 may be operated by at least two techniques, each, however, allowing the backup battery BB to charge at all times that the engine is running and power is plentiful.

A second mode for operating the system of FIG. 1, may involve disabling the backup battery charger $CH^1$ (switch S opened) when the engine shuts down, and monitoring the backup battery voltage at M to determine when the instantaneous backup battery voltage drops below a second predetermined voltage, or the running average of the voltage drops below a third predetermined threshold, at which time the switch S is again closed and the backup battery charger $CH^1$ is re-enabled to permit re-charging to be re-instituted.

First, when the engine shuts down and is no longer running, the control line C from the charge monitor/control unit M will then open and close the charger power control switch S to enable and disable the backup battery charger $CH^1$ for predetermined periods of time, limiting the duty cycle of the backup battery charging to a predetermined percentage of time based upon earlier experimental determination of the minimum percentage of time required to ensure that the backup battery will continue to be restored to full or near full charge in the event of the worst case current consumption by the communication equipment while the engine is shutdown for extended periods of time. For purposes of simplicity, reference herein to "full charge" is intended to embrace, also, nearly full charge. Additionally, while the engine is shutdown and no longer running, the monitor M monitors the backup battery voltage via line $M^1$. In the event that the drain by the communications equipment (or otherwise) during the engine shut off causes the backup battery voltage subsequently to draw below a first predetermined voltage, the monitor M will then, via control line C, close the charger power control switch control S and re-enable the backup battery charger $CH^1$ at 100% duty cycle for a predetermined period of time to institute further additional re-charging, to further replenish the charge of the backup battery BB, after which re-charging will again be limited to the above-mentioned minimum percentage of time when the further charging has thereupon terminated. The above steps will be repeated, as required.

A second mode for operating the system of FIG. 1, may involve disabling the backup battery charger $CH^1$ (switch S opened) when the engine shuts down, and monitoring the backup battery voltage at M to determine when the instantaneous backup battery voltage drops below a predetermined voltage, or the running average of the voltage drops below a second predetermined threshold, at which time the switch S is again closed and the backup battery charger $CH^1$ is re-enabled to permit re-charging to be re-instituted. When the monitor determines, however, that the backup battery voltage has increased above a fourth predetermined voltage, indicating that the charge has dropped below the charger current limit, the backup battery charger $CH^1$ is allowed to continue charging for a predetermined period of time based upon earlier experimental determination of the minimum period of charge time, after the charge rate has dropped below the charger current limit, that is required to achieve full or near-full charge; and then the opening of switch S will again disable the backup battery charger BB. The above steps will be repeated, as required.

FIG. 2 is similar to FIG. 1 but provides additional circuitry for the monitoring of the current into the backup battery charger $CH^1$ through the use of a current sensor CS in series in the line to the backup battery charger $CH^1$, monitored via line $CS^1$ by the monitor M. The monitoring of this input current to the backup battery charger $CH^1$ while it is enabled, and during the quiescence of the engine, provides for determining when the input current drops below a predetermined level, indicating that the backup battery BB is at or near full charge, at which time, the backup battery charger is disabled. Again, the above steps can be repeated, as required.

In the further modification of FIG. 3, the current into or into and out of the backup battery is monitored with a current sensor CS connected between the backup battery charger $CH^1$, using a resistor R in series with the backup battery BB to provide a means to monitor the current.

In the case of monitoring the charge current into the backup battery BB, when the backup battery charge current drops below the predetermined level that indicates that the backup battery BB is at or near full charge, the voltage output of the backup battery charger $CH^1$ remains above a predetermined voltage below which the charger is in current limit. The lack of charge current would be due to the fact that the battery is discharging to provide additional current to the communication equipment load. At such time, the backup battery charger $CH^1$ is disabled by the opening of the charger power control switch S. This disabling is maintained for a further predetermined period of time calculated to ensure that, under the previously described worst case conditions, the backup battery BB will not be discharged below a minimum desired capacity, at which time the backup battery charger $CH^1$ is then re-enabled—once more with the required repetition of these last-named steps.

Where both the current into the backup battery BB and the current out of the same are both monitored in the system of FIG. 3, as before mentioned, while the engine is shut down, the backup battery charger is again disabled (switch S opened) and the backup battery voltage and the discharge current or both are monitored at M. When it is determined by such monitoring that the backup battery voltage drops below a predetermined voltage relative to the existing discharge current, the backup battery charger is then re-enabled (switch S closed). When the monitored backup battery charge current drops below a predetermined level indicative of the backup battery reaching full or near full charge and without starting to produce a discharge current, the backup battery charger $CH^1$ is again disabled and the further charging terminated. Once more, the above steps are repeated as required.

Additional modifications will also occur to those skilled in this art, and such are considered to fall within the spirit and scope of the invention as defined in the appended claims.

What is claimed:

1. In a vehicular engine equipment system provided with an engine-chargeable main battery aid provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine fully charging the backup battery from the main battery; monitoring the charge state of the backup batten during periods of non-operating of the engine and of continued power demands upon the backup battery by the communication equipment; and, upon the monitored reaching of a predetermined level of discharge of the backup battery, further charging the backup battery from the main battery back to full charge and thereupon terminating such further charging; and repeating said monitoring and further charging and terminating as needed during the continued non-operating of the engine and the continued operational power demands of the communication equipment, wherein said predetermined level of discharge corresponds to a drop in the backup battery voltage below a predetermined voltage or the running average of voltage drops below a second predetermined voltage, and wherein when the monitoring indicates that the backup battery voltage has increased above a third predetermined voltage indicating that the charge current has dropped below a charger current limit, the further charging being continued for a further minimum predetermined period of time based upon earlier experimental determination of the additional time required to achieve full charge.

2. In a vehicular engine equipment system provided with an engine-chargeable main battery and provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine; fully charging the backup battery from the main battery; monitoring the charge state of the backup battery during periods of non-operating of the engine and of continued power demands upon the backup battery by the communication equipment, and, upon the monitored reaching of a predetermined level of discharge of the backup battery, further charging the backup battery from the main battery back to full charge and thereupon terminating such further charging; and repeating said monitoring and further charging and terminating as needed during the continued non-operating of the engine and the continued operational power demands of the communication equipment, wherein the input current to the backup battery during its charging is sensed, and when the input current is sensed to drop below a predetermined level indicative that the backup battery is fully charged, further charging of the backup battery is terminated.

3. The method of claim 2 wherein the further charging during the continued non-operating of the engine is maintained for a limited time based upon earlier experimental determination of the minimum percentage of time required to ensure the full charge of the backup battery in the event of a worst case current consumption by the communication equipment while the engine was non-operating for extended periods of time.

4. The method of claim 2 wherein said predetermined level of discharge corresponds to a drop in the backup battery voltage below a predetermined voltage or the running average of voltage drops below a second predetermined voltage.

5. In a vehicular engine equipment system provided with an engine-chargeable main battery and provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine; fully charging the backup battery from the main battery; monitoring the charge state of the backup battery during periods of non-operating of the engine and of continued power demands upon the backup battery by the communication equipment; and, upon the monitored reaching of a predetermined level of discharge of the backup battery, further charging the backup battery from the main battery back to full charge and thereupon terminating such further charging; and repeating said monitoring and further charging and terminating as needed during the continued non-operating of the engine and the continued operational power demands of the communication equipment, wherein the charging current into the backup battery is monitored, and when the charge current drops below the predetermined level indicative of full charge while the voltage output of the backup battery remains above a predetermined voltage below which the charging is in current limit, thereupon terminating the charging.

6. The method of claim 5 wherein the charging termination is maintained for a further period of time calculated to ensure that, under worst case conditions, the backup battery will not be discharged below a minimum desired capacity, at which time the further backup battery charging is resumed.

7. In a vehicular engine equipment system provided with an engine-chargeable main battery and provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine; fully charging the backup battery from the main battery; monitoring the charge state of the backup battery during periods of non-operating of the engine and of continued power demands upon the backup battery by the communication equipment; and, upon the monitored reaching of a predetermined level of discharge of the backup battery, further charging the backup battery from the main battery back to full charge and thereupon terminating such further charging; and repeating said monitoring and further charging and terminating as needed during the continued non-operating of the engine and the continued operational power demands of the communication equipment, wherein the charging current into and out of the backup battery are both monitored while the engine is non-operating, and when such monitoring determines that the backup battery voltage has dropped below a predetermined voltage relative to the existing discharge current, the further charging of the backup battery is re-enabled.

8. In a vehicular engine equipment system provided with an engine-chargeable main battery and provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine; fully charging the backup battery from the main battery: monitoring the charge state of the backup battery during periods of non-operating of the engine and of continued power demands upon the backup battery by the communication equipment; and, upon the monitored reaching of a predetermined level of discharge of the backup battery, further charging the backup battery from the main battery back to full charge and thereupon terminating such further charging; and repeating said monitoring and further charging and terminating as needed during the continued non-operating of the engine and the continued operational power demands of the communication equipment, wherein when the monitored backup battery charge current drops below a predetermined level indicative of the backup battery reaching full charge and without the start of the discharge current, the further backup battery charging is again terminated.

9. In a vehicular engine equipment system provided with an engine-chargeable main battery and provided also with engine operational information (and where desired positional information) communicating electronic radio transponder/transceiver communications equipment having backup batteries, a method of enabling the efficient charging of such backup batteries from the main equipment battery while regulating the power consumption by the communication equipment, that comprises, charging the main battery from the engine during the operating of the engine; fully charging the backup battery from the main battery; monitoring the charge state of the backup battery during periods of non-operating of the engine and of continued power demands upon the backup battery by the communication equipment; and, upon the monitored reaching of a predetermined level of discharge of the backup battery, further charging the backup battery from the main battery back to full charge and thereupon terminating such further charging and repeating said monitoring and further charging and terminating as needed during the continued non-operating of the engine and the continued operational power demands of the communication equipment wherein the backup battery is discharged from its own battery charger, and which is connected or disconnected to or from the main battery under the control of the monitoring.

10. A vehicular engine equipment system provided with an engine-chargeable main battery and provided also with vehicle positional and/or engine operational information-communication electronic radio transponder/transceiver communication equipment having backup batteries, apparatus for enabling the efficient charging of such backup batteries from the main battery, while regulating the power consumption by the communication equipment, said apparatus having, in combination, an engine-power charging circuit for charging the main battery from the engine during the operating of the engine; a backup battery charging circuit connectable to and disconnectable from the main battery charging circuit for fully charging the backup battery from the main battery; a monitor and control circuit for monitoring the charge state of the backup battery of the transponder/transceiver and during the operation of the same during periods of non-operating of the engine; upon the reaching of a predetermined level of discharge of the backup battery, said circuit controlling the connecting of the main and backup battery charging circuits for further charging the backup battery from the main battery back to full charge and thereupon terminating such further charging; the monitor and control circuit enabling the repeating of said monitoring further charging and terminating as needed during the continued non-operating of the engine and the continued operational demands of the communication equipment and wherein said predetermined level of discharge corresponds to a drop in the backup battery voltage below a predetermined voltage or a running average of voltage drops below a second predetermined voltage.

11. The apparatus of claim 10 wherein the further charging is maintained during the non-operating of the engine for a limited time based upon earlier experimental determination of the minimum percentage of time required to ensure full charge of the backup battery in the event of a worst case current consumption by the communication equipment while the engine was non-operating for extended time periods.

12. The apparatus of claim 10 wherein when the monitor indicates that the backup battery voltage has increased above a third predetermined voltage indicating that the charge current has dropped below a charger current limit, the further charging is continued for a further minimum predetermined period of time based on earlier experimental determination of the additional time required to achieve full charge.

13. A vehicular engine equipment system provided with an engine-chargeable main battery and provided also with vehicle positional and/or engine operational information-communicating electronic radio transponder/transceiver communication equipment having backup batteries, apparatus for enabling the efficient charging of such backup batteries from the main battery, while regulating the power consumption by the communication equipment, said apparatus having, in combination, an engine-power charging circuit for charging the main battery from the engine during the operating of the engine; a backup battery charging circuit connectable to and disconnectable from the main battery charging circuit for fully charging the backup battery from the main battery; a monitor and control circuit for monitoring the charge state of the backup battery of the transponder/transceiver and during the operation of the same during periods of non-operating of the engine; upon the reaching of a predetermined level of discharge of the backup battery, said circuit controlling the connecting of the main and backup battery charging circuits for further charging the backup battery from the main battery back to full charge and thereupon terminating such further charging; the monitor and control circuit enabling the repeating of said monitoring further charging and terminating as needed during the continued non-operating of the engine and the continued operational demands of the communication equipment, and wherein a sensor is provided for sensing the input current to the backup battery during its charging, and when such senses that the input current drops below a predetermined level indicative of the backup battery being fully charged, said further charging of the backup battery is terminated.

14. A vehicular engine equipment system provided with an engine-chargeable main battery and provided also with vehicle positional and/or engine operational information-communicating electronic radio transponder/transceiver communication equipment having backup batteries, apparatus for enabling the efficient charging of such backup batteries from the main battery, while regulating the power consumption by the communication equipment, said apparatus having, in combination, an engine-power charging circuit for charging the main battery from the engine during the operating of the engine; a backup battery charging circuit connectable to and disconnectable from the main battery charging circuit for fully charging the backup battery from the main battery; a monitor and control circuit for monitoring the charge state of the backup battery of the transponder/transceiver and during the operation of the same during periods of non-operating of the engine; upon the reaching of a predetermined level of discharge of the backup battery, said circuit controlling the connecting of the main and backup battery charging circuits for further charging the backup battery from the main battery back to full charge and thereupon terminating such further charging; the monitor and control circuit enabling the repeating of said monitoring further charging and terminating as needed during the continued non-operating of the engine and the continued operational demands of the communication equipment, wherein the monitor circuit also monitors charging current into the backup battery, and when the charge current drops below the predetermined level indicative of full charge while the voltage output of the backup battery remains above a predetermined voltage below which the charging is in current limit, terminating the charging.

15. The apparatus of claim 14 wherein the charging termination is maintained for a further period of time calculated to ensure that, under worst case conditions, the backup battery will not be discharged below a minimum desired capacity, at which time re-instituting of the backup battery charging is resumed.

16. A vehicular engine equipment system provided with an engine-chargeable main battery and provided also with vehicle positional and/or engine operational information-communication electronic radio transponder/transceiver communication equipment having backup batteries, apparatus for enabling the efficient charging of such backup batteries from the main battery, while regulating the power consumption by the communication equipment, said apparatus having, in combination, an engine-power charging circuit for charging the main battery from the engine during the operating of the engine; a backup battery charging circuit connectable to and disconnectable from the main battery charging circuit for fully charging the backup battery from the main battery; a monitor and control circuit for monitoring the charge state of the backup battery of the transponder/transceiver and during the operation of the said during periods of non-operating of the engine; upon the reaching of a predetermined level of discharge of the backup battery, said circuit controlling the connecting of the main and backup battery charging circuits for further charging the backup battery from the main battery back to full charge and thereupon terminating such further charging; the monitor and control circuit enabling the repeating of said monitoring further charging and terminating as needed during the continued non-operating of the engine and the continued operational demands of the communication equipment, and wherein a sensor is provided for sensing the charging current into and out of the backup battery and both are monitored by the monitor circuit while the engine is non-operating; and when such monitoring determines that the backup battery voltage has dropped below a predetermined voltage relative to the existing discharge current, the re-instituting of the further charging of the backup battery is re-enabled.

17. The apparatus of claim 16, wherein when the monitored backup battery charge current drops below a predetermined level indicative of the backup battery reaching full charge and without the start of the discharge current, the further backup battery charging is again terminated.

18. A vehicular engine equipment system provided with an engine-chargeable main battery and provided also with vehicle positional and/or engine operational information-communicating electronic radio transponder/transceiver communication equipment having backup batteries, apparatus for enabling the efficient charging of such backup batteries from the main battery, while regulating the power consumption by the communication equipment, said apparatus having, in combination, an engine-power charging circuit for charging the main battery from the engine during the operating of the engine; a backup battery charging circuit connectable to and disconnectable from the main battery charging circuit for fully charging the backup battery from the main battery; a monitor and control circuit for monitoring the charge state of the backup battery of the transponder/transceiver and during the operation of the same during periods of non-operating of the engine; upon the reaching of a predetermined level of discharge of the backup battery, said circuit controlling the connecting of the main and backup battery charging circuits for further charging the backup battery from the main battery back to full charge and thereupon terminating such further charging; the monitor and control circuit enabling the repeating of said monitoring further charging and terminating as needed during the continued non-operating of the engine and the continued operational demands of the communication equipment, and wherein the backup battery is charged from its own battery charger, which is connected to or disconnected from the main battery under the control of the monitor.

* * * * *